United States Patent [19]

Grobben et al.

[11] 4,363,120
[45] Dec. 7, 1982

[54] RECORD PLAYER SPEED CHANGING MECHANISM

[75] Inventors: Henri M. Grobben; Michel H. F. Decoster, both of Eindhoven, Netherlands

[73] Assignee: U.S. Philips Corporation, New York, N.Y.

[21] Appl. No.: 216,235

[22] Filed: Dec. 15, 1980

[30] Foreign Application Priority Data

Jan. 10, 1980 [NL] Netherlands ......................... 8000151

[51] Int. Cl.³ .......................... G11B 3/60; F16H 7/08
[52] U.S. Cl. ................................................. 369/267
[58] Field of Search ............... 369/266, 267, 239, 189; 474/78–80

[56] References Cited

U.S. PATENT DOCUMENTS 3,025,066 3/1962 Siebert ............................ 369/267 X
3,101,950 8/1963 Schneider ............................ 369/267
3,570,318 3/1971 Nakadaira ........................ 369/267 X Primary Examiner—Harry N. Haroian

[57] ABSTRACT

A belt drive record player having a turntable mounted on a main frame and a motor mounted on a resiliently supported sub-frame. A switching member having two fork limbs, for transferring the belt between different speed pulleys, is mounted on the sub-frame and is movable between two positions defined by stops on the sub-frame. A control member mounted on the main frame is disengaged from the switching member except when the speed is being changed.

8 Claims, 5 Drawing Figures

RECORD PLAYER SPEED CHANGING MECHANISM

BACKGROUND OF THE INVENTION

The invention relates to a record player having a main frame which supports a turntable provided with a cylindrical drum, and carries a drive motor having a motor spindle which extends at least substantially parallel to the axis of rotation of the turntable and on which is mounted a pulley formed with two grooves of different diameters in parallel planes. A flexible belt is passed around the cylindrical drum and engages selectively in one or the other groove of the pulley. The belt is transferrable from one groove to the other groove and vice versa by means of a switching fork which forms part of a switching member and is movable between two stationary positions to effect the transfer. The switching member can be coupled to a control member mounted on the main frame, and to positioning means provided for cooperating with the switching member to retain the switching fork in the respective stationary position after transfer of the belt.

A record player of this type is known from U.S. Pat. No. 3,838,859. In this known record player the drive motor is directly secured to the main frame. During playing of a gramophone record this may result in disturbing noise produced by the motor, so-called "rumble," which is transmitted to the pick-up arm and the pick-up element connected thereto by the main frame. When playing records said noise may become audible to an annoying degree. In this known record player, the noise may furthermore be transmitted to the gramophone record, which is concentrically disposed around the control member, by the switching member, which in the stationary positions is rigidly connected to the control member, and reach the pick-up element along this path also.

SUMMARY OF THE INVENTION

It is the object of the invention to arrange the drive motor and the switching fork in such a way relative to the main frame that the above transmission of noise produced by the drive motor is avoided.

According to the invention both the drive motor and the switching member are mounted on a sub-frame, which is resiliently mounted relative to the main frame, and the switching member is disengaged from the control member in the two stationary positions.

Thus, a record player is obtained in which unwanted noise produced by the motor during operation cannot be transmitted to the pick-up element either through the connection between the motor and the main frame or through the switching member.

This arrangement still permits remote control of the switching fork by means of the control member. Mounting the drive motor and the switching member on a special sub-frame makes it possible to position the drive motor and the switching member accurately relative to each other before they are mounted in the record player. Thus, after the sub-frame has been mounted in the record player these components need no further adjustment, so that the risk of the belt running out of the selected groove of the pulley as a result of incorrect positioning of the switching fork is minimized.

In a suitable embodiment of the invention the control member comprises a coupling fork and, situated between the limbs of the coupling fork, a coupling member which is connected to the switching member, and which is entirely clear of the limbs of the coupling fork in the two stationary positions of the switching fork. The use of such a construction provides a simple yet reliable coupling and disengagement of the switching member and the control member.

The U.S. Pat. No. 3,838,859 furthermore describes a record player of the previously mentioned type, in which the stationary positions of the switching fork are defined by stops which co-operate with the switching member. In a preferred embodiment of the invention the stops are connected to the sub-frame. This means that the switching member engages the stops on the sub-frame in the stationary positions, thereby also preventing unwanted noise from being transmitted along this path to the main frame and hence to the pick-up element. Furthermore, this makes it possible to accurately define the stationary positions of the switching fork relative to the pulley by accurately locating the stops.

In this respect it is of advantage if the sub-frame is constituted by a housing of the drive motor, which housing is formed integrally with the stops which co-operate with the switching member. In this way both the pulley and the stops are situated in accurately defined positions relative to the housing and thus relative to the motor, so that an adjustment of the switching fork relative to the pulley is not necessary.

Preferably both the switching member and the control member are movable between stops, the respective stops being arranged in such a way relative to each other that after movement of the control member against a stop the switching member is disengaged from the control member by a further movement of the switching member against a further stop. The stops and the travel of the coupling member and the coupling fork respectively ensure that in the stationary positions the switching fork is entirely clear of the control member.

In this preferred embodiment it is also of great advantage if the positioning means for retaining the switching fork in the respective stationary position are arranged between the sub-frame and the switching member and also cause the switching member and the control member to disengage from one another. In this way the positioning means can also be accurately disposed relative to the sub-frame, so that the stationary positions of the switching fork are accurately defined relative to the sub-frame.

It is even more advantageous if there are positioning means for the control member, which means retain the control member in a respective one of two stationary positions determined by the associated stops after disengagement of the switching member from the control member. Such positioning means for the control member ensure that after the control member has been reset the control member and the switching member are disengaged again until the control member is reset again.

Suitably, both the positioning means for the switching fork and the positioning means for the control member are constituted by separate over-center switching springs.

A suitable construction of a record player in accordance with the invention is obtained if the control member comprises an electrical switch which, through an actuating member which is secured to the sub-frame, moves the switching member between its stationary positions.

The invention will be described in more detail with reference to the drawings, which show some embodiments, to which embodiments the invention is not limited.

DESCRIPTION OF THE PREFERRED EMBODIMENTS

Figure 1:
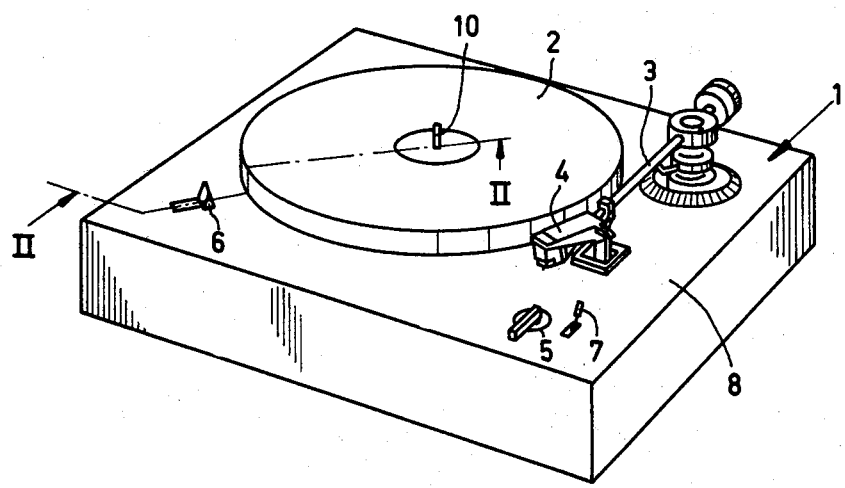
FIG. 1 is a perspective view of a record player in accordance with the invention.

The record player shown in FIG. 1 comprises a main frame 1, which in the customary manner supports a number of components, such as a turntable 2 and a pick-up arm 3, provided with a pick-up element 4.

Furthermore, the main frame accommodates a number of customary controls for the actuation of the record player, such as a control knob 5 for starting and stopping the operation of the record player, a control knob 6 for selecting the turntable speed, as well as a lever 7 for lifting and lowering the pick-up arm 3.

Figure 2:
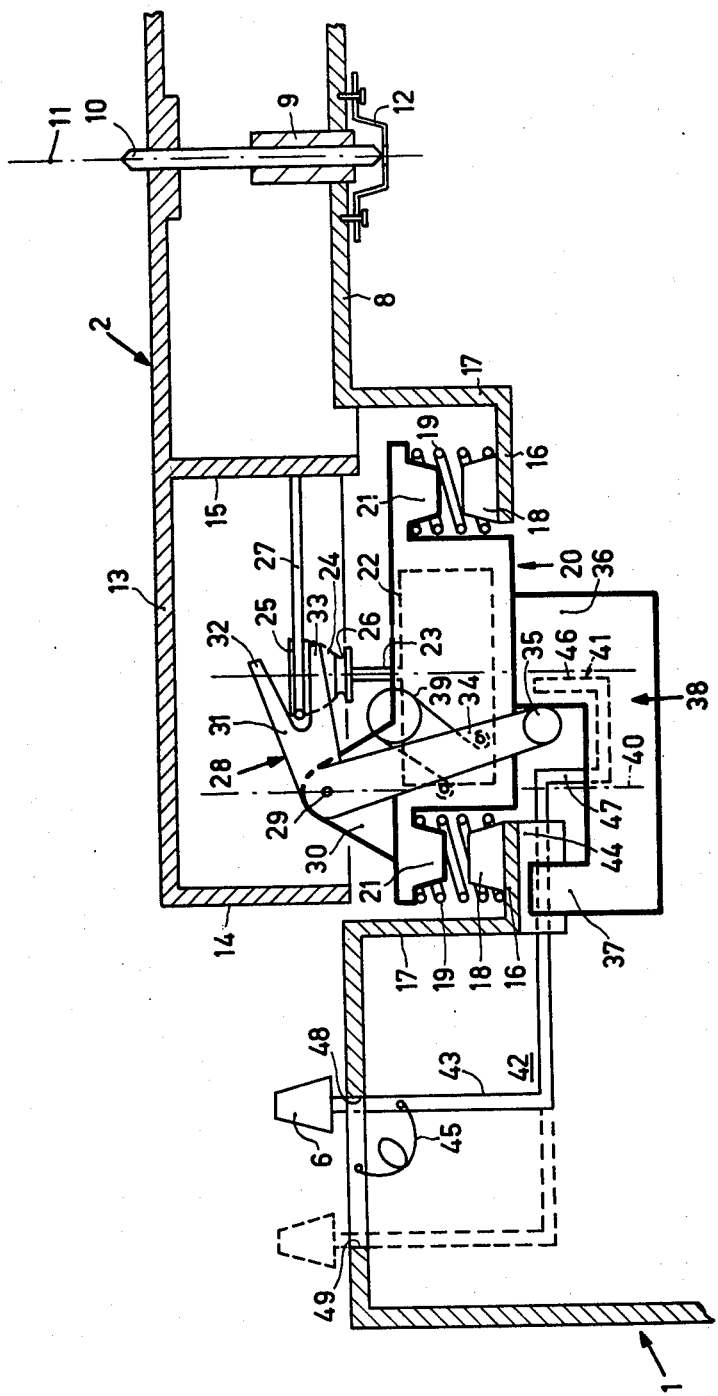
FIG. 2 shows on an enlarged scale, partly in elevation and partly in a cross-sectional view taken on the lines II—II in FIG. 1, those parts of the record player which are relevant to the invention.

Viewed in the normal operating position as shown in FIG. 2, the main frame 1 comprises a deck plate 8 at the top, which is preferably manufactured integrally with the other parts of the main frame 1 from a plastic material by injection molding. The desk plate 8 supports a bearing bush 9 in which a spindle 10 is mounted for rotation about an axis 11. The axis of rotation is perpendicular to the deck plate 8.

At the bottom the spindle 10 is supported by a retaining plate 12, which is screwed onto the underside of the deckplate 8. The spindle 10 is rigidly connected to a supporting plate 13 of the turntable 2. The supporting plate 13 is disposed parallel to the deck plate 8.

The supporting plate 13 has a circular circumference where it adjoins a cylindrical turntable rim 14 which is concentric with the axis of rotation 11. Between the rim 14 and the axis of rotation 11 a cylindrical drum 15 is disposed, which is also concentric with the axis of rotation 11. Suitably, the supporting plate 13, the rim 14 and the drum 15 are formed as an integral unit manufactured from a plastic material by injection molding.

The main frame 1 comprises a number of motor supports 16, preferably three, which are situated below the deck plate 8 and which are connected to the deck plate 8 by connecting portions 17. The motor supports 16 and the connecting portions 17 are also formed integrally with the main frame 1 by injection molding. On the upper side of each motor support 16 is a conical projection 18 which constitutes a support for a helical spring 19 arranged on the projection. The helical springs 19 together support a sub-frame 20 formed with conical projections 21 which extend into the helical springs 19 in the direction of the respective projections 18. Viewed in FIG. 2 the sub-frame 20 is situated at least substantially within a space bounded by a plane tangential to the turntable rim 14 and a plane tangential to the drum 15. The sub-frame 20 constitutes a housing for a drive motor 22, which in a manner not shown can be switched on or off by means of the control knob 5. The drive motor 22 comprises a motor spindle 23 which projects above the housing 20, the upper portion of the motor spindle 23 being situated within a space enclosed by the turntable rim 14 and the drum 15.

The motor spindle 23 extends at least substantially parallel to the axis of rotation 11 of the turntable 2. On the upper portion of the motor spindle 23 is mounted a pulley 24 which is formed with two grooves 25 and 26 of different diameters in parallel planes. In this case the groove 25 has a greater diameter than the groove 26.

In the situation represented in FIG. 2 the groove 25 receives a flexible belt 27, which further passes around the cylindrical drum 15. The belt 27 is preferably of square cross-section and constitutes a drive connection between the drive motor 22 and the turntable 2. In the situation represented in FIG. 2, in which the belt 27 engages in the groove 25, the turntable 2 rotates at a speed of 45 revolutions per miunute. If the belt 27 is situated in the groove 26, said speed of rotation is 33 revolutions per minute. For changing over between these two speeds there is provided a switching member 28 which is pivotable about a pivot pin 29 which extends parallel to the deck plate 8 and which is supported by a support 30, which is preferably formed integrally with the injection-molding housing 20.

For transferring the belt 27 from the groove 25 to the groove 26 and vice versa, a switching fork 31, which forms part of the switching member and is movable between two stationary positions, has two limbs 32 and 33 which, as is shown in FIG. 2, converge from their free ends in the direction of the pivot pin 29. The switching member 28 further comprises an arm 34, which in the longitudinal direction extends substantially normally to the bisector of the angle formed between two planes containing the inner sides of the limbs 32 and 33. The arm 34 extends downwards from the switching fork 31 relative to the deck plate 8, an end portion of the arm 34, as is shown in FIG. 2, carrying a pin 35.

The axis of the pin 35 extends at least substantially parallel to the axis of the pivot pin 29. By pivoting the switching member 28 about the pivot pin 29 the pin 35 is movable between two stationary end positions, which are determined by stops which co-operate with the pin 35 of the switching member and which are constituted by locating limbs 36 and 37 respectively of a locating member 38 which is connected to the housing 20. The locating member 38 is suitably formed integrally with the housing 20 by injection-molding, so that it is possible to accurately define the locations of the stops relative to the housing 20. In the two stationary positions the pin 35 is urged against the locating limbs 36 and 37 respectively under the influence of a switching spring 39, which is connected at one end to the arm 34 and at the other end to the housing 20. This ensures that in each of the two stationary positions of the switching member 28 the limb 33 or 32 respectively of the switching fork 31 is accurately aligned relative to the groove 25 or 26 respectively in the pulley 24. When pivoted about the pin 29 the arm 34 moves through a plane which extends perpendicularly to the deck plate 8 and contains the axis of the pivot pin 29 and which is designated by the reference numeral 40 in FIG. 2. The switching spring 39 is an over-center spring, so that when the end of the spring which is connected to the arm 34 has passed through the plane 40, the spring urges the arm 34 into the stationary position towards which it is being moved.

The pin 35 constitutes a coupling member for cooperation with a coupling fork 41 which forms part of a control member 42 which is attached to the deck plate 8 and thus to the main frame 1. In addition to the coupling fork 41 the control member 42 comprises the previously mentioned control knob 6 and a rod 43 which extends between the coupling fork 41 and the knob 6. The rod 43 is movable in a guide provided preferably in the form of two ridges 44 on the underside of the deck plate 8. The control knob 6 is kept in one or the other of two stationary positions by an over-center switching spring 45, the pin 35 then being entirely clear of the coupling fork 41, as is shown in FIG. 2. By means of the control member 42 the switching member 28 is movable between its two stationary positions. For this purpose the coupling fork 41 comprises two limbs 46 and 47, between which the pin 35 is disposed. When the control knob 6 is moved in one or the other direction between its two stationary positions, the respective limb 46 or 47 first moves into contact with the pin 35 and then takes the pin 35 through the plane 40, after which the arm 34 is moved on by the switching spring 39 until the pin 35 engages the relevant locating limb 37 or 36. Meanwhile, the control member 42 is moved further under the influence of the spring 45 until the rod 43 has been brought into abutment with a corresponding one of two stops 48 and 49 on the deck plate 8 which determine the stationary positions of the control member 42. Thus, both the switching member 28 and the control member 42 are movable between stops, the pin 35 of the switching member being movable over a smaller distance than the coupling fork 41 of the control member. As a result of this pin 35 is entirely clear of the limbs 46 and 47 in the two stationary positions, so that the switching member 28 is disengaged from the control member 42 in the two stationary positions.

The record player described in the foregoing operates as follows. When the control knob 5 has been set to the starting position, the motor 22 will drive the turntable 2 via the belt 27. As stated previously, if the belt 27 is in engagement with the groove 25, the speed of the turntable 2 will be 45 revolutions per minute. This corresponds to the position of the control knob 6 shown in FIG. 2, the rod 43 connected to the knob 6 being urged against the stop 48 under the influence of the switching spring 45. For switching the speed from 45 to 33 revolutions per minute the control knob 6 is moved to the left in FIG. 2, the switching spring 45 urging the rod 43 of the control member 42 against the stop 49. Thus, the control member 42 is always urged into one or the other of the two stationary positions and held there by positioning means constituted by the switching spring 45. During the movement of the control member 42 the switching member 28, under the influence of the coupling between the coupling fork 41 and the coupling pin 35, pivots about the pin 29 until the coupling pin 35 reaches the locating limb 37. The switching member 28 is urged into this stationary position and held there by positioning means constituted by the switching spring 39.

When the control member 42 reaches the position determined by the stop 49, the relevant limb 46 of the coupling fork 41 is so positioned that under the influence of the switching spring 39 the pin 35 can move some distance beyond the limb 46. The switching member 28 and the control member 42 consequently disengage from each other.

Owing to the movement of the switching member 28 the switching fork 31 is moved in a downward direction to transfer the belt 27 from the groove 25 in the pulley 24 to the groove 26.

In the record player in accordance with the invention the construction which has been described ensures accurate positioning of the limbs 32 and 33 of the switching fork 31 relative to the grooves 25 and 26 respectively in the pulley 24 upon change-over of the turntable speed. This is ensured by the locating limbs 36 and 37, whose positions are accurately defined relative to the housing 20. Consequently, when the switching member 28 is mounted no further adjustment of the fork 31 relative to the pulley 24 is necessary. As one of the limbs of the switching fork 31 is accurately aligned with a respective one of the grooves in the pulley in both stationary positions of the switching member 28, it is virtually impossible for the belt 27 to run out of the groove as a result of contact of the belt 27 with one of the limbs 32 and 33.

A further advantage is that, owing to the resilient suspension of the motor housing 20 and the optimum isolation of each of the components connected to the housing 20, disturbing noise from the motor, the so-called "rumble", connot be transmitted from the motor to the deck plate 8 and thus to the pick-up element 4. The separation between the switching member 28 and the control member 42 in the stationary position o the switching member prevents motor noise from being transmitted along another path, while in spite of this the switching member 28 can be arranged remotely from the housing 20 at the most convenient location from the operator's point of view. As the described construction of the housing 20 and the components connected thereto enables them to be made by injection molding, not only are problems in respect of tolerances between the various components avoided, but also a construction is obtained which is suitable for mass-production and which can be produced in a simple and inexpensive manner.

Figure 3:
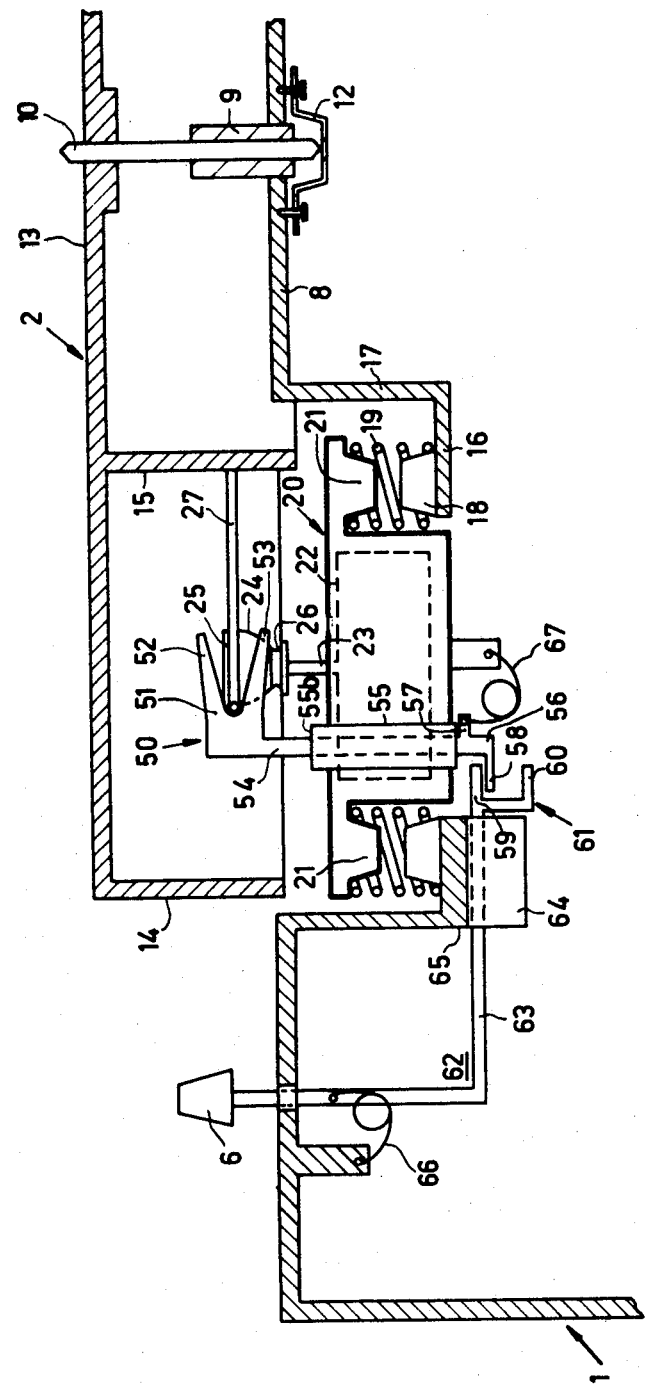
FIG. 3 shows on an enlarged scale, partly in elevation and partly in a cross-sectional view taken on the lines II—II in FIG. 1, a second embodiment of a record player in accordance with the invention.

In the embodiment of FIG. 3 a switching member 50 is employed which is movable in a direction parallel to the motor spindle 23 to transfer the belt 27 from the groove 25 in the pulley 24 to the groove 26 and vice versa. The switching member 50 comprises a fork 51 with limbs 52 and 53, and a rod 54, which is slidable axially in a guide sleeve 55. The sleeve 55 is mounted on the housing 20; it is also possible to form the sleeve 55 integrally with the housing 20 by injection molding. An end portion 56 of the switching member 50 is connected to the rod 54. The end portion 56 comprises a projection 57, which in the position shown in FIG. 3 engages with a stop constituted by a lower end surface of the guide sleeve 55. The end portion 56 further comprises a pin 58 which, in a similar way to the pin 35 in the first embodiment, functions as a coupling member. The pin 58 is situated between the limbs 59 and 60 of a coupling fork 61, which forms part of a control member 62. The control member, in addition to the coupling fork, comprises a rod 63, which is movable in a guide 64 connected to the deck plate 8. Above the deck plate 8 the rod 63 is provided with the control knob 6. The control member 62 is displaceable between two stationary positions by moving the control knob 6 in a direction substantially perpendicular to the deck plate 8. These stationary positions are determined by a stop plate 65 in the guide 64 and by a stop constituted by the upper side of the plate 8, the control knob 6 being movable into abutment with the latter stop in the downward direction. In this embodiment there are also provided positioning means, comprising an over-center switching spring 66, for urging the control knob into the selected stationary position and holding it there.

The switching member 50 is also movable between two stationary positions, determined on the one hand by a stop formed by the lower end surface of the guide sleeve 55, with which stop the projection 57 engages, and on the other hand by a stop formed by the upper end surface 55b of the sleeve 55, with which stop the switching fork 51 engages. The switching member 50 also is urged into the selected stationary position and held there by positioning means constituted by an over-center switching spring 67. In this embodiment also a suitable location of said stops ensures that after each actuation of the control member 50 the pin 58 and the relevant limb 59 or 60 are disengaged from each other. In this embodiment it is thus ensured that a correct location of the switching fork 51 relative to the pulley 24 is obtained, while as a result of the described disengagement of the switching member 50 and the control member 62 no motor noise can be transmitted to the pick-up element 4 in this embodiment.

Figure 4:
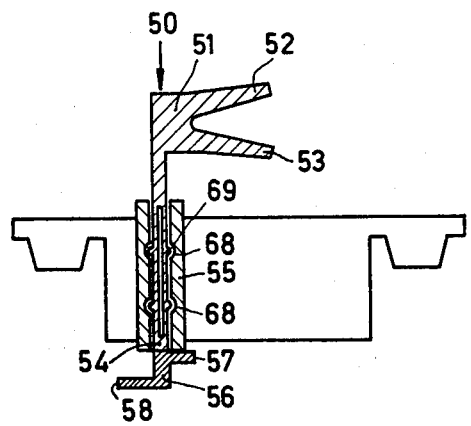
FIG. 4 is a cross-sectional view of a part of a switching member in a third embodiment of a record player in accordance with the invention.

As is shown in FIG. 4 it is possible to employ different positioning means for keeping the switching member and the control member in the selected stationary position. In FIG. 4, for example, the guide sleeve 55 for the switching member 50 is formed with axially spaced circumferential grooves 68 in its inner surface for engagement by circumferential ridges 69 on the rod 54. This also results in an accurate location of the switching member 50 in the two stationary positions.

Figure 5:
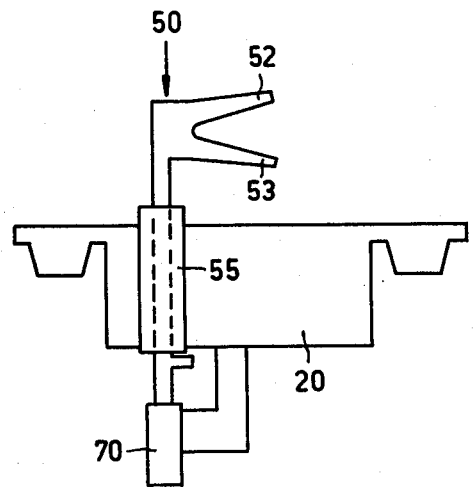
FIG. 5 is a cross-sectional view of a part of a fourth embodiment of a record player in accordance with the invention.

It is to be noted that there are also other possible ways of obtaining a separation, in accordance with the invention, between the switching member and the control member. As is shown in FIG. 5, it is possible to actuate the switching member 50 by means of an electrically or electromagnetically operating actuating member 70 mounted on the housing 20, which actuating member can be controlled by means of an electrical switch, not shown, which is connected to the control knob 6. The knob 6 and the switch then together constitute the control member. The actuating member 70 may than also perform the function of the positioning means in the preceding embodiments, in order to keep the switching fork in the selected stationary position.

What is claimed is:

1. A record player comprising
a main frame,
a turntable having a cylindrical drum, supported on the main frame for rotation about an axis, the drum being concentric with said axis,
a sub-frame resiliently mounted relative to the main frame,
a drive motor mounted on the sub-frame, having a motor spindle extending at least substantially parallel to said turntable axis, said motor spindle further including a pulley formed with two grooves of different diameters in parallel planes,
a flexible belt disposed to pass around said cylindrical drum and engaging selectively in one or the other groove of the pulley,
a switching member comprising a switching fork, movable between two stationary positions to effect transfer of the belt from one groove to the other,
a control member mounted on the main frame,
means for coupling the control member to the switching member to effect the transfer, and
positioning means for retaining the switching fork in the respective stationary position after transfer of the belt,
characterized in that the switching member is mounted on the sub-frame for movement between the two stationary positions, and that the record player further comprises stop means connected to the sub-frame for determining the stationary positions of the switching member, and means for disengaging the switching member from the control member when the switching member is in either of the stationary positions.

2. A record player as claimed in claim 1, characterized in that the control member comprises a coupling fork having two limbs, and said coupling means comprises a coupling member connected to the switching member, said coupling member being disposed between the limbs of the coupling fork and being entirely clear of the limbs of said coupling fork in the two stationary positions of the switching fork.

3. A record player as claimed in claim 1, characterized in that the sub-frame is constituted by a housing of the drive motor, said stops which cooperate with the switching member being formed integrally with said housing.

4. A record player as claimed in claim 1, characterized by further comprising two respective stops for the control member connected to the main frame, and said means for disengaging the switching member from the control member include means for further moving the switching member against a respective stop, after the control member is moved against a stop.

5. A record player as claimed in claim 4, characterized in that the positioning means for retaining the switching fork in the respective stationary positions is arranged between the sub-frame and a switching member, and said means for disengaging includes said positioning means.

6. A record player as claimed in claim 4 or 5, characterized by further comprising positioning means for the control member for retaining the control member in a respective one of two stationary positions determined by the respective stops for the control member, after disengagement of the switching member from the control member.

7. A record player as claimed in claim 6, characterized in that both the positioning means for the switching fork and the positioning means for the control member are constituted by separate over-center springs.

8. A record player as claimed in claim 1, 2, 3, 4, or 5, characterized by an actuating member secured to the sub-frame, and in that the control member comprises an electrical switch which engages the actuating member for moving the switching member between its stationary positions.

* * * * *